United States Patent [19]

Di Giulio

[11] 4,393,386

[45] Jul. 12, 1983

[54] INK JET PRINTING APPARATUS

[75] Inventor: Peter C. Di Giulio, Fairfield, Conn.

[73] Assignee: Pitney Bowes Inc., Stamford, Conn.

[21] Appl. No.: 307,339

[22] Filed: Sep. 30, 1981

[51] Int. Cl.[3] ......................... G01D 15/18; G01D 5/26

[52] U.S. Cl. ......................................... 346/75; 346/1.1

[58] Field of Search ........................... 346/1.1, 75, 140

[56] References Cited

U.S. PATENT DOCUMENTS

| | | | |
|---|---|---|---|
| 3,555,558 | 1/1971 | Sherman | 346/75 |
| 3,797,022 | 3/1974 | Beam et al. | 346/75 |
| 3,803,628 | 4/1974 | Van Brimer et al. | 346/1.1 |
| 3,913,719 | 10/1975 | Frey | 346/1.1 X |
| 3,964,591 | 6/1976 | Hill et al. | 346/75 X |
| 3,992,712 | 11/1976 | Dill et al. | 346/75 X |
| 4,115,788 | 9/1978 | Takano et al. | 346/75 |
| 4,167,013 | 9/1979 | Hoskins et al. | 346/75 |
| 4,346,393 | 8/1982 | Wallace et al. | 346/140 PD |

*Primary Examiner*—Donald A. Griffin

*Attorney, Agent, or Firm*—Melvin J. Scolnick; Albert W. Scribner; William D. Soltow, Jr.

[57] ABSTRACT

An ink jet printing apparatus is described wherein an array of ink jet heads of the impulse jet type is compled to print sheets such as envelopes traveling past the heads. The ink jet heads are spaced along the travel path of the sheets and laterally staggered to print different image lines. The apparatus includes a microprocessor and controllers which are associated with individual heads. The controllers include buffers which are loaded with image signals derived from a font memory in correspondence with data to be printed. Presettable delay networks are used in the controllers to precisely determine when an ink jet head is to be printed in relationship with the detection of sheets at a particular distance relative to the heads. The ink jets heads are operated in timed relationship with each other and in synchronism with the traveling sheets while their associated buffers are reloaded at the proper times for a continual printing of different information such as addresses on envelopes.

10 Claims, 4 Drawing Figures

INK JET PRINTING APPARATUS

FIELD OF THE INVENTION

This invention relates to ink jet printing. More specifically, this invention relates to timing and control apparatus and method for printing with ink jets.

BACKGROUND OF THE INVENTION

Ink jet printing of characters such as alphanumeric or bar code types is well known and commonly employs so-called continuous ink jets or impulse type ink jets. A continuous ink jet ejects a fast stream of ink droplets which are controllably deflected to print characters on a sheet. An impulse ink jet ejects ink droplets for printing only in response to individual electrical pulses. In a typical impulse ink jet head a plurality of ink retaining orifices are formed at the front of the head and the droplets are ejected from each orifice depending upon the character to be printed.

The characters printed with an ink jet head are formed of patterns of dots. The dot pattern may be chosen in view of desired font type. Computer control of an ink jet to print characters is well known.

SUMMARY OF THE INVENTION

In an ink jet printing apparatus in accordance with the invention, a plurality of ink jet heads in an array are spaced in staggered fashion along the direction of travel of sheets moved past the array to print different lines on the sheets. Storage means associated with individual ink jet heads is provided to retain image signals for the heads. The image signals, when applied to the ink jet heads cause the ejection of droplets and thus a printing of an image such as characters. A timing and control for the application of the character signals is employed to apply the image signals to the staggered ink jet heads in timed relation with each other and thus print the various lines on the sheets with desired registration and after the image signals from the storage means are applied to an ink jet head store a new set of image signals for printing the next sheet.

An ink jet printing apparatus in accordance with the invention is advantageously constructed with a programmable microprocessor with which image signals for printing a sheet are assembled in buffers individually associated with ink jet heads in the array. The buffers are connected to respective ink jet heads and loaded with image signals such as characters for a line during a time when no printing is required, and actuated to apply the image signals to ink jet heads at the precise time when printing is to be done.

A timing and control is provided with which the storing of image signals into the buffers and subsequent application to the ink jet heads is precisely executed. This includes sensing of sheets, such as their leading edge at a particular place along their direction of travel and then timing the start of printing of the ink jet heads from this edge detection. The distance of the ink jet heads from the place of sheet detection is precisely known, so that during the time interval between sheet detection and the start of printing by an ink jet head, a buffer associated with the ink jet head can be loaded with image signals.

A particular advantage of an ink jet printing apparatus in accordance with the invention involves an adjustable control over the duration of the time interval between sheet detection and the start of printing. In this manner an image line from any ink jet head can be moved to the left or right of a sheet to accommodate desired locations for the line. The adjustments can be made very small and precise.

With an ink jet printing apparatus in accordance with the invention, impulse ink jet heads having a plurality of ink ejecting orifices can be advantageously used. For example, an impulse ink jet head having twelve orifices arranged in two side by side rows of six orifices may be used. A buffer containing a matrix of image signals and which is twelve bits wide is employed to store the image signals. Since the rows of orifices are spaced along the direction of relative motion between the sheets and the ink jet heads, a small time delay is employed to delay the application of image signals to one such row of orifices and thus obtain a straight alignment of the printing from both rows of orifices.

It is, therefore, an object of the invention to provide an ink jet printing apparatus with which precise timing and control of ink jet printing is achieved for a plurality of ink jet heads arranged in an array in staggered fashion to print different image lines along a direction of relative movement between sheets and the array.

These and other advantages and objects of the invention can be understood from the following detailed description of an embodiment of the invention and illustrated in the drawings.

DETAILED DESCRIPTION OF DRAWINGS

Figure 1:
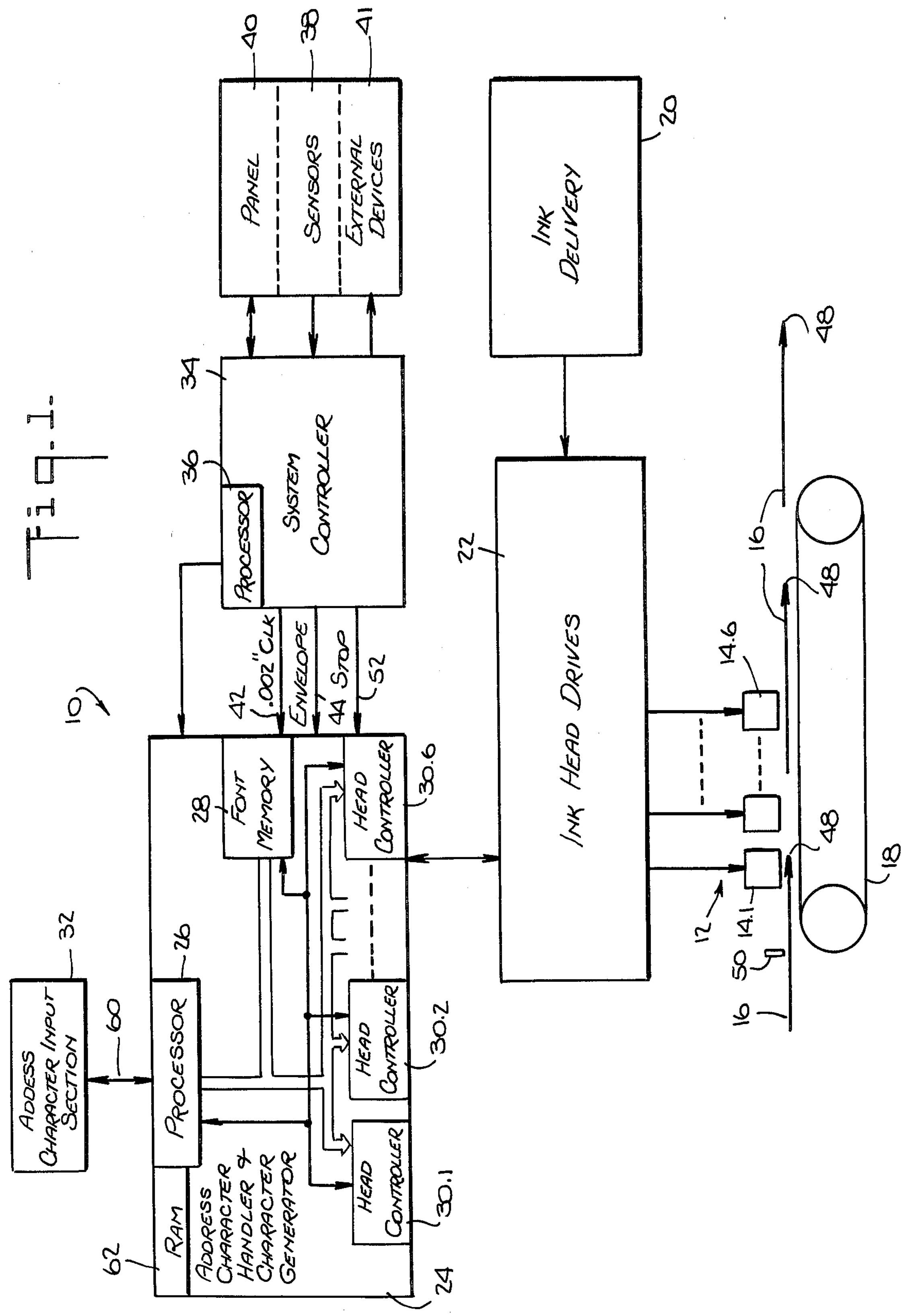
FIG. 1 is a block diagram of an ink jet printing apparatus in accordance with the invention.

With reference to FIG. 1 an ink jet printing apparatus 10 is shown with an array 12 of ink jet heads 14 disposed to print sheets 16 traveling in the direction indicated by the arrows. The specific embodiment is adapted to print addresses on sheets formed of envelopes, though as can be appreciated other types of sheets can be printed.

The sheets 16 are moved past the array 12 with a belt drive 18, though relative motion may be obtained by reciprocatingly moving the array 12. Connecting sheet feeding, moving and collecting devices have been deleted for clarity.

The array 12 of ink jet heads 14 is supplied with ink from a delivery system 20. Ink jet head drive system 22 is provided to supply appropriate ink drive signals to the ink jet heads 14. The ink jet head contemplated for the embodiment of FIG. 1 is an impulse jet head type which together with its drive system 22 are known devices that can be obtained from sources such as the Siemens Electric Company.

The array of ink jet heads 14 is arranged in staggered fashion along the direction of travel to print lines of address characters on envelope type sheets 16. Image signals for activating heads 14 are applied from an image or character signal generator 24. This comprises a microprocessor 26, a font memory 28, and a plurality of ink jet head controllers 30.1–30.6, one for each ink jet head 14. The microprocessor 26 also has suitable memory to store program instructions and printing data derived from a remote image input section 32. In the embodiment as shown, the sheets 16 are envelopes and each is printed with address information derived from an address type character input section 32.

The ink jet printing apparatus 10 further includes a system controller 34 which is formed with another suitable microprocessor 36 to respond to information from a sensor section 38, a panel 40 and generate control signals for use by external device section 41. The controller 34 provides the generator 24 with a clock pulse on line 42 whose pulses have a rate corresponding to incremental relative movements between the sheets 16 and array 12, such as of the order of 0.002". Controller 34 also provides generator 24 with a sheet or envelope detect signal on line 44, corresponding, for example, to the detection of the leading edge 48 of a sheet 16 at a location at 50 ahead of array 12. The sheet signal is representative of the distances of each detected sheet 16 from the ink jet heads 14. A stop signal on line 52 of controller 34 is produced to inhibit operation of generator 24, for example, in the case of jams of sheets or other malfunctions detected with sensor section 38.

The head controllers 30 which may be a part of the microprocessor in generator 24 include image signal storage means in the form of buffers 56 (see FIG. 2) which provide a matrix storage comparable to that needed to print a line of characters on an envelope sheet 16. Hence, once a buffer 56 is loaded with image signals, a clock such as derived from the clock on line 42 can be used to apply the image signals in a group to activate a plurality of orifices in a head 14 until the line is printed by the head 14. At this time the buffer 56 needs to be reloaded with new image signals for printing of a different line, usually on a new sheet 16. Data for reloading of a buffer is derived from a memory in generator 24, which memory in turn is replenished with data from a remote data processor which communicates character information through character input section 32 along a standard RS232 communication link 60 to processor 26 in generator 24.

For example, when system 10 is used to print addresses on envelope type sheets 16, the ink jet heads 14 may be each used to print one line of the address. In such case the address information for one or several envelopes is initially transmitted to processor 26 at a standard baud rate, e.g. 9600 bits per second and the address information, is accumulated by processor 26 in a suitable random access memory (RAM) 62 in a manner as is well known in the communication of data using RS232 protocol.

Figure 3:
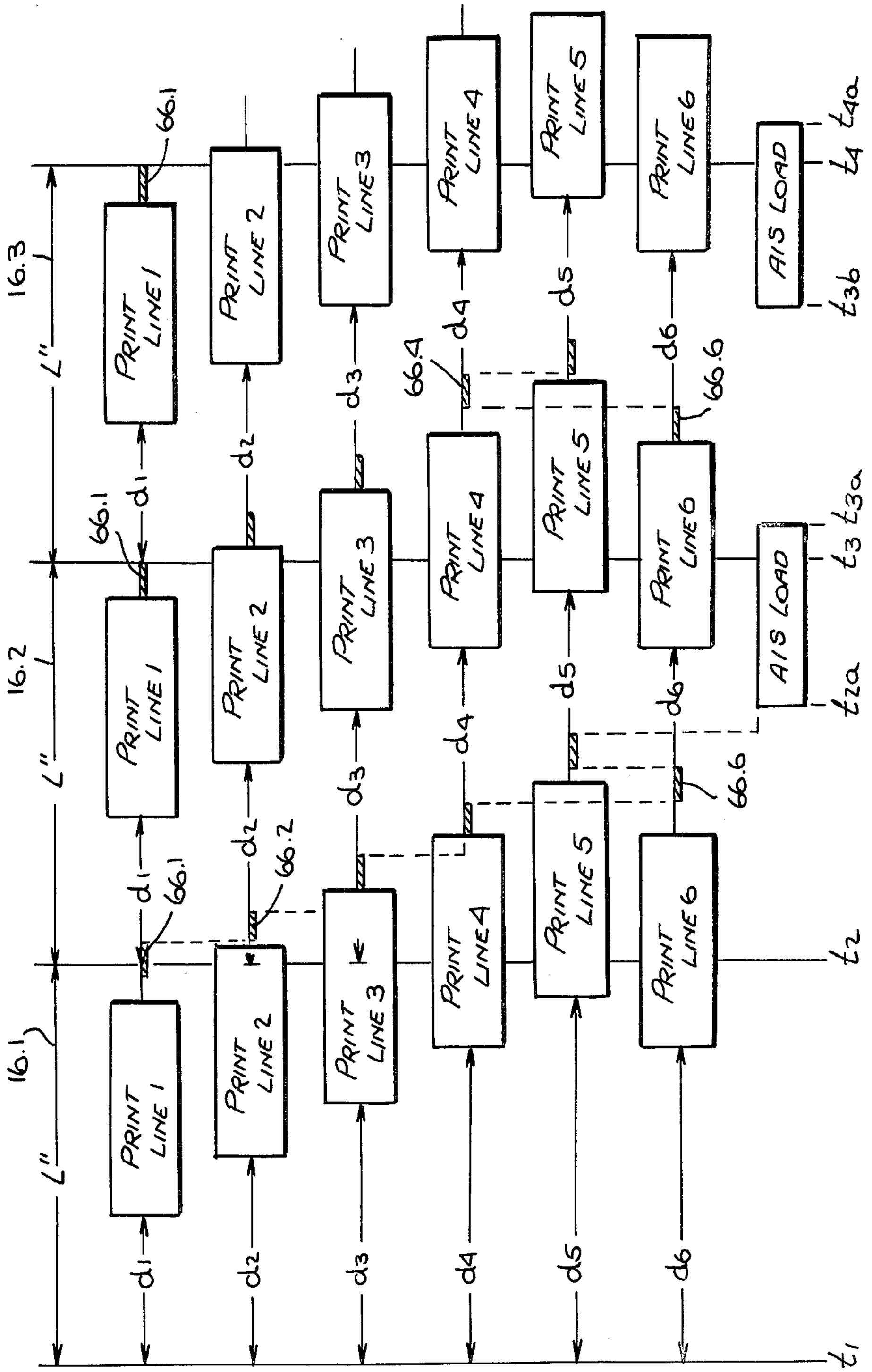
FIG. 3 is a timing diagram for illustrating the operation of the ink jet printing apparatus in accordance with the invention.

The address data in RAM 62 is stored in memory locations in a manner respectively associated with the ink jet heads 14 and when a load request is made by a head controller 30 stored in appropriate buffers 56. The timing and control employed to operate the ink jet heads 14 and cause printing of sheets 16 can be appreciated with reference to the timing diagram of FIG. 3. In this Figure successive sheets 16 are shown very closely spaced for illustration only. In practice, the sheets 16 are separated by spaces which would be shown in FIG. 3 as a small time interval. The time of detection of the leading edge 48 (see FIG. 1) of a sheet 16 is represented by time lines $t_1$, $t_2$, $t_3$ and $t_4$.

At time $t_1$ a first sheet detection signal is produced as a pulse on line 44 (see FIG. 1). Thereafter head controller 30.1 for the closest spaced head, measures a time interval or delay, $d_1$ following which character signals are permitted to be applied to head 14.1 to print a character line on sheet 16.1 passing the head 14.1. Printing continues until all of the character signals in an associated buffer have been applied to head 14.1, at which time, printing by this head ceases. A request to reload the associated buffer is then made to the generator 24 (see FIG. 1). This request is promptly honored unless a reload request for another buffer is currently being carried out. The loading of the buffer 56 for head controller 30.1 may thus be done at a time as suggested by the heavily shaded segment at 66.1.

Similarly, head controller 30.2 for ink jet head 14.2 measures a time interval $d_2$ following detection of a sheet 16 leading edge at time $t_1$. However, since ink jet head 14.2 is further away from the place where the sheet leading edge is detected, the time interval, $d_2$, depending on the printing interval for head 14.1, tends to be of longer duration. The maximum time available for printing with ink jet head 14.2 is the same as for head 14.1 since the sizes of the buffers storing their respective character signals are the same. A reload of the buffer associated with ink jet head 14.2 is done similarly at a time during the next delay interval $d_2$. The printing with the other ink jet heads 14.3–14.6 follows a similar pattern with the delay intervals d selected to properly locate the line on the sheet being printed. Likewise, subsequent reloading of associated buffers is done during intervals d.

When the image generator 24 (see FIG. 1) has applied all of its image information for one sheet to the head controllers 30, such as at a time after the last buffer has been loaded while the second sheet 16.2 is being printed and fresh information is needed, a request is made by generator 24 for new character information from section 34. This is done on an interrupt basis of processor 26. The time interval from $t_{2a}$ to $t_{3a}$ is suggestive as to when this information may enter image generator 24 via the RS232 communication link 60.

In the above manner sheets 16 can be passed rapidly past a plurality of printing heads 14 and printed with lines of information, such as address lines on envelopes. New addresses are quickly and accurately obtained from a remote data processor in multiple groups in time for printing on successive envelopes.

Figure 2:
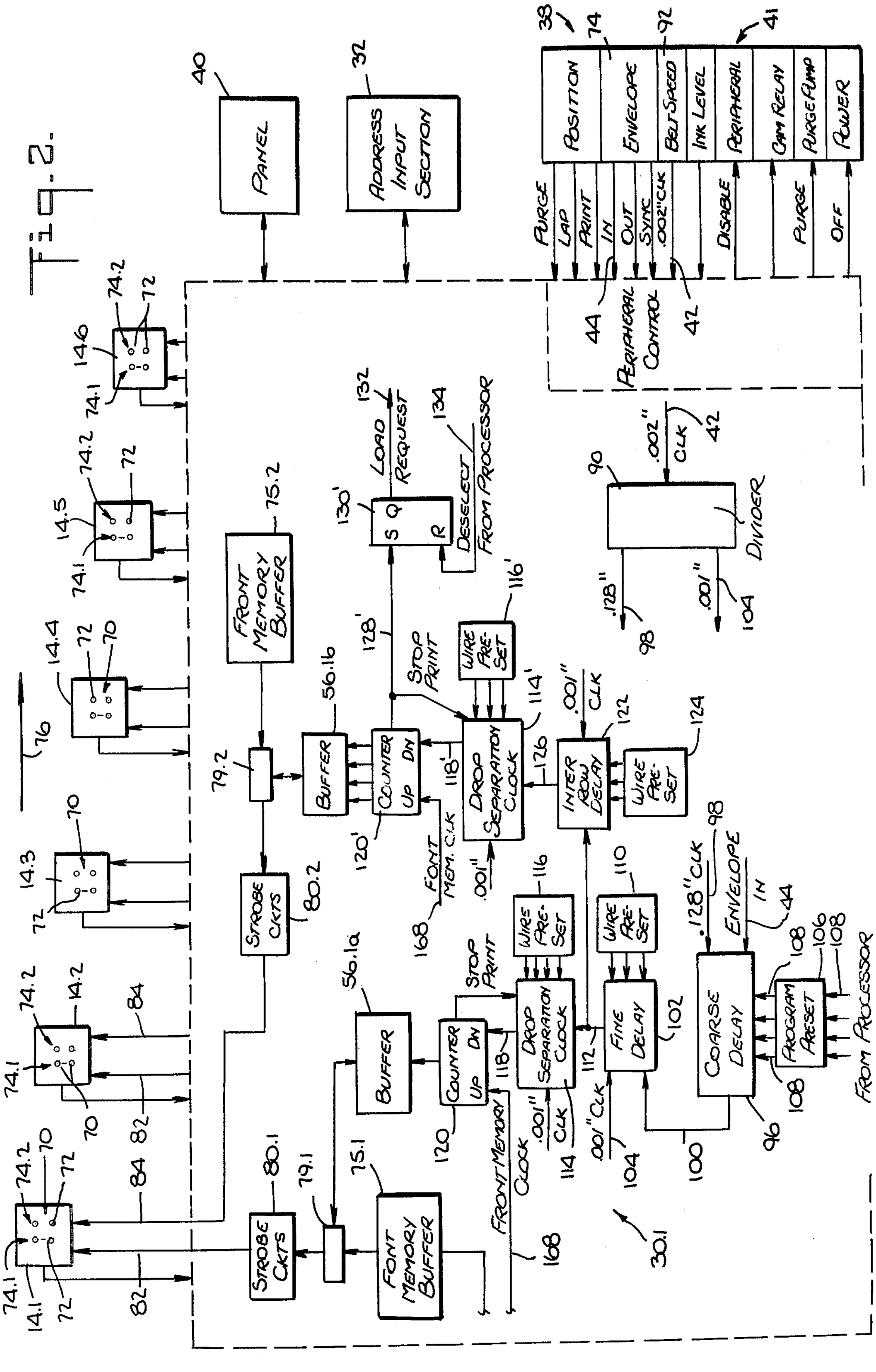
FIG. 2 is a more detailed block diagram of a timing and control employed in accordance with the invention for an array of ink jet heads.

FIG. 2 illustrates several components of image generator 24 in greater detail. The impulse ink jet heads 14 are illustrated having each an array 70 of orifices 72 which are individually actuated to eject a droplet of ink. The orifices 72 are arranged in a pair of side by side rows 74.1, 74.2 aligned transverse to the direction of travel of sheets 16 as represented by arrow 76. The rows 74.1, 74.2 are slightly vertically displaced so that the drops may slightly overlap to print a continuous straight line.

Since the head controllers 30 are alike, only one, 30.1 is shown in detail. Each head controller 30 includes buffer storage of a matrix of bits, N×M, where N represents the number of ink drop ejecting orifices 72 employed in a head 14 and typically may be equal to twelve. M represents the number of drops or image signals that can be stored in a buffer, and defines the maximum length of a line that can be printed by any one head 14 from a single buffer load. For example, if the buffer length M is 1000, and a character may be formed of a field of ink drops that is 10 drops wide, then a full buffer 56 can store 100 characters. A buffer 56 suitable for this invention thus may have a storage capacity of 12×1000 bits.

Head controller 30.1 supplies image signals to orifice rows 74.1 and 74.2 from separate buffers 56.1*a* and 56.1*b* which, therefore, each have correspondingly smaller storage capacity. The initial loading of these buffers occurs along separate lines directly from font memory buffers 75.1 and 75.2 in font memory 28 (see FIG. 1) through switch networks 77.1, 77.2 under control of a font memory clock.

The outputs of buffers 56.1*a* and 56.1*b* are connectable by circuits 79.1 and 79.2 to strobe circuits 80.1 and 80.2 connected to ink jet head 14.1. Circuit 80.1 has its output connected to suitable circuits in head 14.1 via six lines, represented by line 82, to cause ejection of ink drops from orifices 72 in "odd" row 74.1. Similarly, strobe circuit 80.1 is connected by six lines, represented by line 84, to head 14.1 to cause ejection of ink drops from orifices in "even" row 74.2.

Head controller 30.1 includes a clock generator 90 formed of a divider network responsive to clock pulses on line 42 derived from the belt 18 of the sheet transport system. The clock pulses on line 42 thus correspond in frequency to the movement of the drive belt 18. This may be done by sensing belt speed with a sensor 92 and applying pulses indicative thereof to network 90. The latter generates clock pulses which represent very small increments of sheet motion such as of the order of 0.001 inches, on line 104 inches and a coarser pulse rate of 0.128 inches on line 98. The use of a belt speed related clock to apply the image signals to a head 14, automatically compensates for variations in the motion of a sheet as it is being printed.

The application of image signals stored in buffers 56.1*a* and 56.1*b* is commenced by a sheet or envelope-in signal on line 44 from a sheet or envelope detector 94. The sheet-in signal and 0.128 clock signals are applied to a presettable delay counter 96 which in response to the detection of a sheet permits the 0.128 inch clock pulses on line 98 to be counted until a predetermined output such as an overflow occurs on output line 100.

The coarse delay 96 provides a particular advantage of the image generator 24 in that it permits adjustment of the placement of printed information on sheets 16 without physically moving the heads 14 but by controlling the duration of the delay 96. As shown in FIG. 2, delay 96 has a preset latch network 106 into which under program control from processor 26, a count of a particular value is entered along lines 108. The preset latch is so coupled to a counter in coarse delay 96 that after it has counted up to some particular value at the end of its delay, it automatically presets to the value in the latch network 106. In the embodiment delay 96 is a coarse delay capable of moving the lateral location of a printed line in coarse increments such as of the order of 0.128 inches.

The output line 100 of coarse delay 96 is connected to a fine delay 102 which forms a short interval delay for fine line adjustments so that at least one reference place on a sheet can be established where all the printed lines have a particular alignment. Hence, the small incremental 0.001 inch clock pulses on line 104 from network 90 are also applied to fine delay 102. Fine delay 102 is adjustable by a mechanically adjustable preset circuit 110. When a counter in fine delay 102 incremented by pulses on line 104 reaches a predetermined value, an output signal occurs on line 112 representative of a start printing instruction.

The start printing signal on line 112 enables a drop separation clock 114. This normally generates pulses whose time separation is equivalent to the desired spacing between successive rows of ink drops ejected by orifices 72 in any one row 74.1 or 74.2. In the embodiment the separation is formed by applying the incremental 0.001 inch clock pulses on line 104 to a presettable counter having a mechanical preset circuit 116 set to generate separation pulses equivalent to 0.006 inch spacings on output line 118.

The separation pulses on line 118 are coupled to a down count input of an up/down counter 120 associated with buffer 56.1*a* in a manner to cause the latter to clock out its image signals to head 14.1 via strobe circuits 80.1.

Since the orifices in row 74.2 of head 14.1 are slightly spaced from those in row 74.1, printing from the latter row needs to be delayed a small amount. The print signal on line 112 is, therefore, applied to a presettable inter-row delay 122 having a preset input circuit 124. As the incremental 0.001 inch clock pulses on line 104 are counted by a counter in delay 122 and a predetermined count is reached, an output occurs on line 126.

Line 126 is coupled to a drop separation network 114' similar to network 114 and causes clocking out of image signals from buffer 56.1*b* by down counting a counter 120'.

When up/down counters 120, 120' have been counted down to a predetermined value equal to the number of image signals in buffers 56.1*a* and 56.1, a stop print signal is produced on lines 128, 128'. These lines are coupled to clocks 114, 114' to stop their output, while the later occurring signal on line 128' is used to set a flip flop 130 for generating a load request on line 132 to image signal generator 24.

At such time when the generator 24 is able to honor such load request, image signals from font memory 28 are very rapidly loaded into buffers 56.1*a* and 56.1*b* using a much higher memory clock than the printing clock. At the end of such reloading, processor 26 in generator 24 sends out a deselect signal on line 134 to reset flip flop 130.

Figure 4:
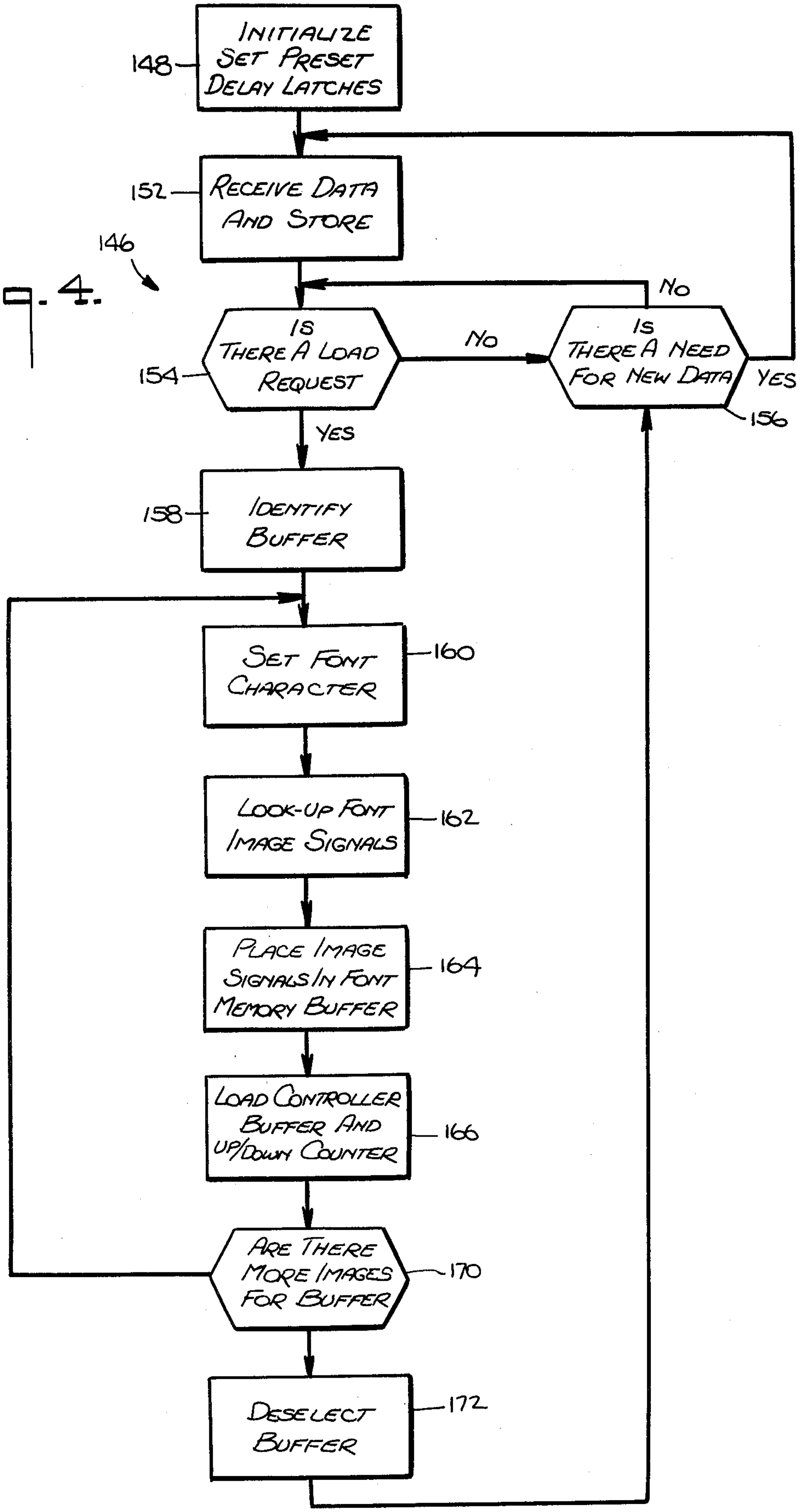
FIG. 4 is a flow chart for a timing and control program used in the apparatus of FIG. 2.

FIG. 4 illustrates a program routine 146 in processor 26 for carrying out the printing operation of the apparatus shown in FIG. 2. At 148 certain initializing steps are taken such as the presetting of the coarse delays d in preset latch circuits 106 by the program in processor 26. The magnitude of the delay is a function of the desired positions of the lines printed by the ink jet heads 14. At 152 data for printing is obtained by the character input section 32. The latter functions with processor 26 on an interrupt basis. In the case of the printing of address information, a number of addresses at a time, e.g. eight, are obtained and stored in RAM memory 62.

The storage of data is so organized that data intended to be printed on a common line on sheets 16 is in a particular sequence with data for other printed lines of the address. A check is then made at 154 whether a load request from any one head controller 30 has been made. If not, a check is made at 156 whether new data needs to be stored in RAM 62 and depending upon this test, a return is eventually made to steps 152 or 154 if other tasks are to be done.

In the event a head controller 30 has made a load request, the buffer 56, i.e. both buffers 56.1*a* and 56.1*b*, is identified at 158 and the type of font to be printed set at 160 such as a font character. This font character may, for example, determine whether the address line is to be printed in capital or lower case letters.

At step 162 the data in RAM to be stored in head controller 30 is taken a character at a time and by a look-up table, the appropriate font memory image signals passed through a font memory buffer 75 at 164 and loaded into a head buffer 56 at 166. This look-up and loading into a buffer is carried out with a high speed memory clock whose pulses are also employed via lines 168 (see FIG. 2) to up-count counters 120, 120'.

A test is then made at 170 in FIG. 5 whether additional data characters need to be loaded into buffer 56. If so, a return is made to step 160. If not, loading of a buffer is ceased and memory clock pulses on line 168 to up/down counters 120, 120' inhibited. A deselect signal is then sent at 172 by processor 26 on line 134 (see FIG. 2) to reset the load request flip flop 130.

The buffers 56.1*a* and 56.1*b* are now cocked to print stored image signals as soon as the connected delay networks in head controller 30.1 have gone through their delays.

Since character data for any one buffer may not require printing of an entire full line, as is particularly true for address types of information, a buffer 56 may be loaded with zero data in appropriate locations both in correspondence with the desired start and ending of printed lines and the length of such lines. The image signals to be printed are thus loaded into a buffer 56 in such manner as to select a desired storage location upon completion of loading. Such buffer storage location selection is made to correspond with the duration of the time intervals for the delays 90.

Having thus explained an image printing apparatus in accordance with the invention, its advantages can be appreciated. Descriptions of various other functions performed by several features of the apparatus as indicated in FIG. 1 have been deleted for clarity such as a purging function used at a start-up of the apparatus, an ink level sensing and response, a sensing of peripheral devices to assure proper ready status at the start of a printing operation as well as control over external devices such as a cam relay for drive belt 18, a purge pump and a power sequence control.

What is claimed is:

1. A computer controlled ink jet apparatus for printing a sequence of sheets with relative movement in a first direction between an ink jet apparatus and the sheets comprising:
   - an array of ink jet heads disposed to each eject ink drops onto the relatively moving sheets, said ink jet heads each having a plurality of ink ejecting orifices and being positioned along said first direction and displaced laterally relative to one another and to said first direction to print different lines of images on the sheets;
   - means for generating image signals representative of the ink drops to be ejected by the ink jet heads for the formation of lines of images on the sheets during relative motion between the sheets and the ink jet heads;
   - storage means for storing image signals for respective ones of said ink jet heads in the array;
   - means for generating sheet signals, each representative of the arrival of a sheet at a location having a known distance from the ink jet heads in the array; and
   - means responsive to the sheet signals for applying said stored image signals to respective ink jet heads for their actuation in a predetermined timed relationship selected to print lines of images on each sheet from the array of ink jet heads at desired sheet locations.

2. The apparatus as claimed in claim 1 wherein said means for applying said stored image signals further includes means for delaying the application of said stored image signals to the ink jet heads by time intervals selected to print each line of images at a desired position on a sheet.

3. The apparatus as claimed in claim 1 or 2 wherein said storage means comprises:
   - a plurality of buffers, each associated with an ink jet head to supply image signals thereto for the printing of a line of images on a sheet; and
   - means for causing a reloading of said buffers with new image signals when the image signals previously stored therein have been applied to an associated ink jet head.

4. The apparatus as claimed in claims 1 or 2 wherein said image signal applying means further comprises:
   - means for generating a clock signal formed of pulses whose repetition rate is a function of the magnitude of the relative motion between the sheets and the ink jet heads, said clock signals being connected to advance image signals to the ink jet heads;
   - means responsive to the clock signals and the sheet signals for delaying the application of the clock signals for delay intervals which are respectively selected for the ink jet heads.

5. The apparatus as claimed in claim 4 wherein said delaying means further includes:
   - means for preselecting the delay intervals and generating signals indicative thereof.

6. The apparatus as claimed in claim 4 wherein the delaying means further comprises:
   - a counter coupled to count said clock pulses, said counter having an output coupled to enable the clock signals to advance the image signals, said counter having a preset input coupled to receive signals from said means for preselecting the delay intervals.

7. The apparatus as claimed in claims 1 or 2 and further including:
   - means for reloading said storage means with new image signals.

8. A computer controlled ink jet apparatus for printing a sequence of envelopes traveling in a first direction comprising:
   - an array of ink jet heads disposed to eject ink drops onto the traveling envelopes and spaced along the direction of travel of the envelopes, said ink jet heads each having a plurality of ink ejecting orifices and being displaced laterally relative to one another and to the direction of travel to print different address lines on the envelopes;
   - means for generating image signals representative of the ink drops to be ejected by the ink jet heads for the formation of lines of images on the envelopes;
   - a plurality of buffers, each for storing image signals for a respective one of said ink jet heads in the array;
   - means for generating envelope signals, each representative of the location of a traveling envelope relative to the ink jet heads in the array at a particular time; and
   - means responsive to the envelope signals for selectively applying image signals in the buffers to associated ink jet heads to cause them to print lines of characters on the envelopes.

9. The apparatus as claimed in claim 8 and further including storage means for storing character information to be printed;

means for detecting when all of said buffers have been reloaded with image signals representative of the stored character information and generating a signal indicative thereof; and means responsive to the latter signal for storing new character information in said storage means.

10. The apparatus as claimed in claim 9 and further including:

means for generating image signals representative of a desired font to be printed and respectively corresponding to the image information in the storage means and placing said image signals in respectively associated buffers.

* * * * *